Patented Mar. 11, 1952

2,588,463

UNITED STATES PATENT OFFICE 2,588,463

PROCESS FOR PREPARATION OF STARCH ETHERS

Ladislaus Balassa, West Barrington, R. I.

No Drawing. Application June 14, 1950, Serial No. 168,166

7 Claims. (Cl. 260—233.3)

This invention relates to a process for preparing novel starch-ether derivatives as well as to the products resulting from said process.

Water-soluble starch derivatives have been customarily prepared as aqueous gels of low concentration. In order to obtain such starch derivatives in a dry form, it is necessary to precipitate them with organic water-miscible solvents such as alcohols, ketones, and the like, in which the starch derivatives were insoluble. Since the by-products of the reaction by which the starch derivatives were formed are, as a rule, alkali metal salts, the organic solvents used to precipitate the starch derivatives also precipitated quantities of salts, thus contaminating the product. The contamination by the salts can be prevented only by removing the salts by means of dialysis or ion exchange prior to precipitation of the starch derivative with the organic solvents.

A method of removing the water from the aqueous dispersion of the starch derivative is to evaporate the water at a pressure lower than atmospheric pressure, i. e. under vacuum conditions. The disadvantages of this process are similar to that of the solvent precipitation, since the alkali metal salt by-products are included in the dried product unless they are removed prior to drying.

Since shipping dilute aqueous paste over long distances is prohibitively expensive, and since dialysis or ion exchange combined with solvent precipitation, or with drying at reduced pressure, is very costly, the commercial use of water soluble starch derivatives has been very limited.

While working with starch derivatives, I made the surprising discovery that these derivatives may be precipitated from their highly viscous reaction mixture by the use of a large excess of a hot saturated solution of an inorganic salt, which latter is capable of giving saturated solutions of high salt content or concentration, and that the starch derivatives precipitated under these conditions are flocculent and for a short period of time after precipitation, may be readily separated from the salt liquor by straining or filtering them through a loose mesh screen or cloth. Furthermore, the starch derivatives precipitated in the above manner can be readily dried at moderate temperatures and although extremely adhesive in nature, they surprisingly did not adhere to the metal drying trays, since the efflorescing salts formed a protecting layer between the product and the trays. I also discovered that when starch derivatives are dried to retain moisture, just sufficient so that they will not shatter to a fine powder but rather become granulated under the impact of a hammer mill, that the efflorescent salts are broken down to a fine powder by the mill. This enabled me to separate by a simple screening procedure the granular starch derivatives from the pulverized salt.

This invention has as an object the production of water-soluble or water-dispersible starch derivatives in dry form. Another object is the production of valuable starch derivatives in commercial quantities. A further object is to produce dehydrated starch derivatives of commercially acceptable purity at low cost. Other objects will appear hereinafter.

The above and further objects may be accomplished by the following invention. Starch, or a modified starch, or a water-soluble derivative thereof, is reacted with either a mono-functional or a poly-functional reactive compound, or a combination of same, under such conditions that a substantial number of the reagent's functional groups will react with the free hydroxyls of the starch. After the reaction has reached the desired point, it is interrupted and the starch derivative thus formed is precipitated at elevated temperature by use of a large excess of a saturated aqueous solution of a suitable inorganic salt. The flocculent precipitate is filtered or strained through a coarse mesh strainer or filter within a short period of time after precipitation and while still hot or within the temperature range at which it was precipitated. The precipitate is then dried at temperatures below that which will cause substantial decomposition (as indicated by discoloration) to such a moisture content that the starch derivative is still sufficiently resilient to resist pulverizing, and yet, it is readily granulated in an impact mill. Under such conditions, a substantial portion of the salt occluded in the precipitate from the mother liquor, effloresces from the mass and appears in a form wherein it is readily broken down to a fine powder in the mill under impacts which granulate only the starch derivatives. It is thus possible to separate by a low-cost screening operation the granulated particles comprising the starch derivative from the pulverized salt particles.

EXAMPLES I 80 lbs. of crude corn starch were suspended in 220 lbs. of water of about 20° C. in a stainless steel jacketed kettle equipped with an agitator. Then 80 lbs. of a 50% solution of sodium hydroxide were added while the slurry was subjected to constant mixing. The starch slurry was converted by the sodium hydroxide into an extremely viscous alkali starch paste. The mixing was continued for 30 minutes, then 16 lbs. of mono-chloroacetic acid dissolved in 32 lbs. water was gradually introduced while constantly stirring. The temperature of the mixture was then increased to 65° C. and the mixing was continued for 30 minutes. The mixing was then stopped and the reaction product was allowed to stand for 2 hours. The agitator was then started again, while the mixture was cooled by circulating cold water through the jackets of the kettle. When the temperature of the reaction mixture dropped to about 25° C., 120 lbs. of 25% sulfuric acid were added with constant stirring to neutralize the product of reaction. The temperature of the mix was then raised to 65° C., when a solution of 73 lbs. of sodium sulfate in 160 lbs. of water, heated to near its boiling point, was added; whereupon the starch-ether exhibited an incipient precipitation. In order to form a readily filterable flocculent precipitate, 100 lbs. of anhydrous sodium sulfate were gradually added. The contents of the kettle were constantly mixed throughout the addition of the acid and of the salt. The hot material was then strained through a coarse fabric or filter. It strained rapidly, giving a clear liquor, yielding a crumbly filter-cake on the cloth. The filter-cake was transferred to stainless steel drying trays and dried for 20 hours at 45° C. in a "vacuum" drier at somewhat lower than atmospheric pressure. The material was dried to about 9% moisture content, forming large slabs with visible efflorescence of salt on the surface of the material. The slabs are readily broken-up and are milled in a comminuting type of hammer mill and finally screened through a 60 mesh screen. The granular material remaining on the screen was 80% carboxymethyl starch-ether, whereas the material passing through the screen consisted essentially of sodium sulfate.

EXAMPLE II

The process used in this example is the same as that used in Example I. The alkali starch, however, was prepared by the use of an equivalent amount of potassium hydroxide in place of the sodium hydroxide in Example I.

EXAMPLE III

The process and the composition used in this example was identical to that of Example I, the only difference being that the filtercake was allowed to air-dry at room temperature for 48 hours before milling and screening.

EXAMPLE IV

The process and the composition used in this example is analogous to that used in Example I, the differences being that the neutralization was carried out with an acid salt cake solution (technical sodium acid sulfate) at 25° C., the temperature was raised to 70° C., and the salting-out was completed with anhydrous sodium sulfate.

EXAMPLE V

The process used in this example was the same as that used in Example I, the starch used was raw wheat starch in lieu of corn starch.

EXAMPLE VI

The process used in this example was the same as that used in Example I, except that the starch used was raw potato starch in place of corn starch.

EXAMPLE VII

The process used in this example was the same as that used in Example I, except that the starch used was cassava starch.

EXAMPLE VIII

The process used in this example was the same as that used in Example I, except that an equal weight of propylene oxide was used in place of the monochloroacetic acid.

EXAMPLE IX

The process used in this example was the same as that used in Example I, except that an equal weight of acrylonitrile was used in place of monochloroacetic acid.

EXAMPLE X

The process used in this example was the same as that used in Example I, except that after the monochloroacetic acid had reacted for 30 minutes, 1.6 lbs. of epichlorohydrin was added to the mix, and then the mixing was continued for 30 minutes before it was allowed to set for two hours, whereupon the process was continued as in Example I.

EXAMPLE XI

The process used in this example was that used in Example X, except that the epichlorohydrin used in Example X was replaced by 0.5 lb. of beta:beta' dichlorodiethyl ether.

EXAMPLE XII

The process used in this example was the same as that used in Example I, except that an equivalent weight of diethyl sulfate was used in place of monochloroacetic acid.

EXAMPLE XIII

The process used in this example was the same as that used in Example I, except that the process was carried out in a closed kettle and the reaction mass was blanketed with nitrogen gas, in order to prevent oxidative degradation of the starch and of the starch-ether formed.

EXAMPLE XIV

The process used in this example was the same as that used in Example I, except that the process was carried out in a closed kettle and the reaction mass blanketed with ammonia gas.

EXAMPLE XV

The process used in this example is the same as that used in Example XIII, except that the reaction mass in this case was blanketed with nitrogen gas containing about 0.5% sulfur dioxide.

*Properties of starch derivatives obtained from the above examples*

| Example | Color | Solubility in water | Consistency of 5% solution |
|---|---|---|---|
| I | Pale tan | Readily soluble | Thin. |
| II | ...do | ...do | Do. |
| III | Very pale tan | ...do | Do. |
| IV | Pale tan | ...do | Do. |
| V | Very pale tan | ...do | Slightly viscous. |
| VI | Pale tan | ...do | Thin. |
| VII | Very pale tan | ...do | Moderately viscous. |
| VIII | ...do | ...do | Slightly viscous. |
| IX | Pale tan | ...do | Thin. |
| X | ...do | Disperses slowly | Very viscous. |
| XI | ...do | ...do | Do. |
| XII | Very pale tan | ...do | Slightly viscous. |
| XIII | Almost white | Readily soluble | Moderately viscous. |
| XIV | ...do | ...do | Do. |
| XV | ...do | ...do | Do. |

The starch materials used in this specification is meant to include not only the usual types of starches, for example, cereal or tuber starches, but also chemically modified, or soluble starches, as well as water-soluble starch derivatives, which still contain the starch nucleus and sufficient free hydroxyl groups capable of combining with the functional groups of the reagents used in the reaction.

The reagents used may have one reactive radical, i. e. mono-functional, or it may have two reactive radicals, i. e. bi-functional, and these radicals must be capable of forming ethers by reaction with hydroxyl groups. In some instances trifunctional or other poly-functional reagents may be employed, or I may use a mixture of mono- and poly-functional reagents. Among the mono-functional reagents which are suitable for reaction are the mono-halogen substituted aliphatic hydrocarbons, such as, methyl chloride, or bromide, and their homologues; epoxy compounds such as ethylene oxide, propylene oxide; and halogen substituted carboxylic acids, such as monochloroacetic acid, its salts and esters as well as homologues, thereof, and unsaturated compounds such as acrylonitrile and the like.

Among the bi-functional reagents useful in this connection are the following: epichlorohydrin, beta:beta':di-chlorodiethyl ether and its homologues, beta:beta' dibromodiethyl sulfide, beta:beta':di-chlorodiethyl sulfone and similar compounds.

The reaction between the starch and the reagent is carried out in an aqueous solution of alkaline hydroxides or other alkaline reactants. The alkali may be an alkali metal hydroxide, preferably sodium or potassium hydroxide, while the alkaline reactant may be an alkali metal carbonate, or a strong organic base such as the quaternary ammonium hydroxides. The concentration of the alkali and the quantity used must be sufficient to convert substantially all the starch to alkali-starch, and to maintain a pH of at least 9, but preferably 12, until the end of the reaction. The temperature at the various stages of the process is adjusted so as to maintain an optimum rate of reaction with the minimum degradation of the starch or the starch derivative. The time required for the various stages of the process will depend upon the concentrations of the alkali and the reagents used, the temperature employed, the velocity of the reaction, the degree of substitution desired and the quality of the end product to be obtained.

When the reaction has progressed to the desired point, it is terminated by neutralizing the alkali with a suitable acid, for example, sulfuric acid, hydrochloric acid, phosphoric acid and the like. While in a preferred embodiment, I use sodium sulfate to salt out the starch derivatives, many other salts such as sodium chloride, ammonium sulfate, potassium sulfate and the like, may be used in the salting-out procedure. However, with some salts the procedure is difficult to carry out because on drying these salts do not effloresce readily, and consequently cannot be as easily separated from the starch derivative, as is the case with sodium sulfate.

The salting-out and the neutralization processes may be carried out simultaneously either by adding a solution of acid salt cake (sodium acid sulfate) until the pH of the reaction mixture drops to below 9, and preferably to about 7, completing the salting-out with anhydrous sodium sulphate. In place of the acid salt cake, a mixture of sulfuric acid and sodium sulfate may be used. Potassium acid sulfate, or sodium or potassium acid phosphates may also be used to simultaneously accomplish both the neutralization and the salting-out procedure.

In order to avoid degrading the starch or decomposing the starch-ether derivative, it is important that the neutralization of the reaction mass should be carried out with dilute acids of not over 25% in strength, if mineral acids are used, and that the temperature of the reaction mass during neutralization preferably should be at or below room temperature, and not over 50° C. Though not desirable, higher temperatures may be employed when very dilute acids are used.

In order to obtain the starch-ether derivative in the form of a flocculent precipitate, it is essential that the salting-out operation is conducted at an elevated temperature, preferably between 60° and 90° C., by introducing into the neutralized reaction mass, a saturated or nearly saturated salt solution at or near its boiling point. Simultaneously, the starch-ether reaction mass is heated externally to within the above temperature range. Enough hot salt solution is then added to the said reaction mass to start visible precipitation of the starch-ethers. When this point is reached, I prefer to continue the salting-out by adding anhydrous salt until the precipitate acquires a flocculent and readily filterable structure. The same result also may be obtained by continuing the addition of the saturated salt solution until the precipitate acquires the desired filterable structure. However, in the latter case, much larger quantities of salt are required as well as larger capacity vessels, which makes the latter process less desirable.

Furthermore it is not desirable to start the salting-out with anhydrous salt, since in such cases the starch derivative usually forms a lumpy precipitate, which contains excessively large quantities of occluded salts, and which can be dried and separated from the starch derivative only with great difficulty.

The flocculent precipitate should be separated from the salt liquor by straining, filtration, or centrifuging, while freshly formed. If the liquor is allowed to cool and the precipitate to remain with the liquor for as short a time as an hour after it is formed, it becomes very difficult to separate such long standing flocs from the liquor.

The filtercake prepared as above described may be air dried, but preferably it is dried at an elevated temperature and at a reduced pressure. It is dried, preferably, to a moisture content of between 5% and 15%. At a higher moisture content the filtercake is either too soft, or too tough and rubbery, to be readily granulated in a hammer mill; nor do the occluded salts readily effloresce from the filtercake at the higher moisture content. If the material is dried to a moisture content much below 5%, the starch-ether derivative breaks up readily into a fine powder and can be separated from the occluded salts only with great difficulty.

The filtercake, dried to the correct moisture content of between 5% and 15%, is broken up in a hammer mill and the granular portion of the milled material, which consists essentially of the starch-ether derivative, is separated through a coarse mesh screen from the pulverized part, consisting essentially of the occluded salts, which latter pass through the screen.

The products of the present invention have numerous and diverse uses in the industrial arts; uses such as thickeners in printing pastes, or as paper sizes, or as detergents, or as textile yarn sizes, or in petroleum drilling fluids, or in agricultural insecticidal sprays, or in edible jellies, ice cream, icings, margarine, mayonnaise, or in the preparation of emulsions, or cosmetic and toilet formulations, or in lotions, polishing and cleaning compounds, adhesives, and the like.

As many obvious embodiments of this invention will be apparent to those skilled in the art, without departing from the spirit and scope thereof, it is to be understood that I do not limit my invention to the specific embodiments described, but rather only as defined in the appended claims.

I claim:

1. The process of preparing starch-ether compounds comprising reacting a solution of alkali metal starch with an etherifying substance adapted to form a reaction product comprising an alkali metal substance and the corresponding starch-ether, treating said reaction product with an acidic substance to neutralize any excess alkali present and to effect a pH of from about 7 to about 9 while maintaining a temperature during neutralization of from about room temperature to about 50° C., flocculating the said starch-ether at an elevated temperature of about 60° C. to about 90° C., by adding a substantially saturated solution of an inorganic salt at substantially its boiling point, separating the flocculated starch-ether from the hot mother liquor by conventional means, air-drying the separated flocculent material to a moisture content of from about 5% to about 15% moisture, disintegrating said air-dried flocculent material into a pulverized salt fraction and a granular starch-ether fraction and separating said pulverized salt fraction from said granular starch-ether fraction.

2. The process of claim 1 wherein flocculating of the starch-ether is effected by addition of a hot salt solution followed by an addition of anhydrous salt to effect a flocculent material having a filterable structure.

3. The process of claim 1 wherein the starch-ether is the reaction product of alkali starch and a mono-functional substance selected from the group consisting of mono-halogen substituted aliphatic hydrocarbons, mono-halogen substituted carboxylic acids, epoxy compounds, and unsaturated nitriles.

4. The process of claim 1 wherein neutralization is effected with an acid of less than 25 per cent acid concentration.

5. The process of claim 1 wherein the neutralization is carried out with a hot acidic solution selected from the group consisting of a solution of hot alkali acid sulfate, and a solution of alkali sulfate and sulfuric acid.

6. The process of claim 1 wherein monochloroacetic acid is used as the etherifying substance.

7. The process of claim 1 wherein the reaction between starch and the etherifying agent is effected in an atmosphere of inert gas selected from the group consisting of nitrogen, ammonia, and nitrogen containing 0.5% sulfur dioxide.

LADISLAUS BALASSA.

REFERENCES CITED

The following references are of record in the file of this patent:

UNITED STATES PATENTS

| Number | Name | Date |
|---|---|---|
| 1,350,820 | Lillienfeld | Aug. 24, 1920 |
| 1,876,920 | Hagedorn et al. | Sept. 13, 1932 |
| 2,148,951 | Maxweil | Feb. 28, 1939 |
| 2,516,634 | Kesler et al. | July 25, 1950 |